United States Patent [19]
Takagi et al.

[11] Patent Number: 5,710,491
[45] Date of Patent: Jan. 20, 1998

[54] DRIVING CONTROL DEVICE FOR VIBRATION WAVE MOTOR

[75] Inventors: Tadao Takagi; Ryoichi Suganuma, both of Yokohama; Daisuke Saya, Urayasu, all of Japan

[73] Assignee: Nikon Corporation, Tokyo, Japan

[21] Appl. No.: 476,554

[22] Filed: Jun. 7, 1995

Related U.S. Application Data

[62] Division of Ser. No. 190,570, Feb. 2, 1994, which is a continuation of Ser. No. 645,329, Jan. 24, 1991, abandoned, which is a continuation of Ser. No. 423,331, Oct. 17, 1989, abandoned.

[30] Foreign Application Priority Data

Oct. 19, 1988 [JP] Japan ................... 63-264726
Dec. 23, 1988 [JP] Japan ................... 63-326919

[51] Int. Cl.⁶ .................. H02N 1/00; H01L 41/08
[52] U.S. Cl. ........................ 318/116; 310/316
[58] Field of Search ............... 310/316, 317, 310/323, 328; 318/116

[56] References Cited

U.S. PATENT DOCUMENTS

| | | | |
|---|---|---|---|
| 4,713,571 | 12/1987 | Suzuki et al. | 310/316 |
| 4,727,276 | 2/1988 | Izukawa et al. | 310/316 |
| 4,794,294 | 12/1988 | Shimizu et al. | 310/316 |
| 4,833,358 | 5/1989 | Suzuki et al. | 310/316 |
| 4,888,514 | 12/1989 | Takahashi et al. | 310/316 |
| 5,061,882 | 10/1991 | Takagi | 318/116 |
| 5,140,231 | 8/1992 | Kashiyama | 318/116 |
| 5,159,253 | 10/1992 | Shimizu et al. | 310/316 X |

Primary Examiner—Mark O. Budd
Attorney, Agent, or Firm—Shapiro and Shapiro

[57] ABSTRACT

A control device for a motor having a stator that generates traveling vibration waves in an elastic member by the excitation of a piezoelectric member, a rotor pressed to contact with the stator and driven by the traveling vibration waves, and a power supply circuit that generates at least one pair of input alternating voltages which are out of phase for exciting the piezoelectric member, and being driven by the vibration waves, comprises a judgment circuit for judging whether the rotor is in an abnormal operating condition, and an amplifying circuit for increasing the voltage magnitude of a pair of alternating voltages from the power supply circuit to a value greater than a predetermined value exceeding the rated voltage of the motor, in response to the fact that the judgment circuit judges that an abnormal operating condition of the motor is in effect.

19 Claims, 6 Drawing Sheets ns from the value at the time of
DRIVING CONTROL DEVICE FOR VIBRATION WAVE MOTOR This is a division of application Ser. No. 08/190,570 filed Feb. 2, 1994, which is a continuation of application Ser. No. 07/645,329 filed Jan. 24, 1991 (abandoned), which is a continuation of application Ser. No. 07/423,331 filed Oct. 17, 1989 (abandoned).

BACKGROUND OF THE INVENTION

1. Field of the Invention

The present invention relates to a driving control circuit for an ultrasonic motor that drives a rotor using traveling vibration waves generated in an elastic member by a piezoelectric member.

2. Related Background Art

A traveling vibration wave type ultrasonic motor is a motor that applies a frequency voltage to a piezoelectric member to cause it to flex and vibrate, thus causing the elastic member, to which the piezoelectric member is stuck, to generate traveling vibration waves, and pressing the rotor into contact with this elastic member to drive it by friction, as disclosed in Japanese Patent Laid-Open No. 59-111609.

This ultrasonic motor has such characteristics that if a load increases sharply while it is rotating, it diverts from resonance and stops. When it stops under this condition, the phase difference between a frequency voltage applied to the piezoelectric member (hereinafter called input voltage) and a monitor voltage (voltage generated by the deformation of a piezoelectric member) diverts from the value at the time of normal rotation, and the vibrations of the stator almost disappear. In this specification, such a state is called a vibration diversion state.

In a piezoelectric member having such characteristics, if variations in load occur due to changes in temperature and humidity, variations in pressure, or changes in viscosity of the lubricating oil in the bearings, the member is liable to enter the vibration diversion state, with the result that there is a possibility that the motor may suddenly stop, so its reliability of operation is low.

As a measure to counter such a vibration diversion state, a control device has been proposed that shifts the driving frequency to a restart frequency higher than the resonance frequency, after which it resets to a normal driving point by lowering the frequency, as disclosed in the specification of U.S. Ser. No. 152,644 dated Feb. 5, 1988, abandoned in favor of U.S. Ser. No. 361,744 filed May 30, 1989, now U.S. Pat. No. 4,914,337.

However, it is time-consuming for a voltage, the frequency of which is higher than the resonance frequency, to be applied to a piezoelectric member of such an ultrasonic motor, and then for a lower frequency voltage to be applied. For a motor that drives a lens-barrel in the focusing device of a camera, one that performs a recovery operation from the vibration diversion state more rapidly has been desired.

In addition, such an ultrasonic motor is a friction contact type motor, and has the problem that its starting characteristics are unstable. FIG. 7 is a figure illustrating this phenomenon. Input voltage $V_R$ is taken as the horizontal axis, and the number of rotations N is taken as the vertical axis.

When the input voltage $V_R$ is applied to a stopped ultrasonic motor by increasing the voltage gradually from zero, there are cases where the motor starts rotating slowly at voltage $V_{R1}$, it starts at $V_{R2}$ greater than voltage $V_{R1}$ initially, and after starting, it rotates at a certain speed. Such phenomena are caused by differences in environment such as temperature, or in number of past uses, or in different manufacturing lots, among other things. So, by regarding this phenomenon at the starting time as one kind of vibration diversion state, starting by the above-described method can be considered. However, since the driving frequency is raised to a region higher than the resonance frequency and is then lowered to a normal frequency, a time lag occurs at the starting time.

SUMMARY OF THE INVENTION

An object of the present invention is to restore an ultrasonic motor which has gone into vibration diversion state to a normal vibration state speedily and easily without releasing the load.

Another object of the invention is to improve the starting characteristics of the ultrasonic motor without a time lag at the starting time.

Referring to FIG. 1 which illustrates one embodiment, the driving control circuit of the invention is used to control the driving of an ultrasonic motor MT equipped with a stator that generates traveling vibration waves in an elastic member by the excitation of a piezoelectric member and a rotor which is pressed into contact with said stator and is driven by the traveling vibration waves. This driving control circuit has a power supply circuit 30 for applying at least one pair of out-of-phase frequency voltages to excite the piezoelectric member.

A judgment circuit 20 for judging the vibration diversion state of the stator is also provided. If the motor is judged to be in the vibration diversion state by the judgment circuit, the power supply circuit raises the voltage magnitude the pair of frequency voltages higher than that at normal times. As a result of this, the above-mentioned purposes are achieved.

It is desirable to arrange the vibration diversion state judgment means 20 in such a way that a frequency voltage and a monitor voltage that are applied to a piezoelectric member 1b are detected by applied voltage detection means for detecting the frequency voltage applied to the piezoelectric member 1b and monitor voltage detection means for detecting a monitor voltage generated as a piezoelectric member 1b changes its shape, the phase differences between them are detected by phase difference detection means, and if the phase difference is detected as being out of a predetermined range, the motor is judged to be a vibration diversion state.

When the motor is judged to be the vibration diversion state, the input voltage to the piezoelectric member is made higher than that at normal times. This enables the ultrasonic motor to immediately be restored to the normal vibration state.

In another embodiment, a power supply circuit 30 sets the voltage magnitude of a pair of frequency voltages to a value that exceeds a specific critical voltage higher than the rated (predetermined operating) voltage at starting time, and sets it to the rated voltage after starting. This enables the above-mentioned purposes to be achieved. The critical voltage is the minimum voltage needed for starting in any environment or within a predetermined number of services.

A voltage exceeding the critical voltage which is higher than the rated voltage is applied to the piezoelectric member at the time a motor is started. This improves the rise characteristics of the ultra-sonic motor. After starting, it is set to the rated voltage.

As disclosed in U.S. Pat. No. 3,997,832, the control system of applying a voltage greater than the rated voltage at starting time in an electromagnetic motor is already known. However, its purpose, functions, and advantages are completely different from that of an ultrasonic motor. In other words, in an electromagnetic motor, the inertia force of a rotor is large, so it takes too much time to reach the number of normal rotations after starting. Therefore, the time required to reach the normal number of rotations is shortened by applying a voltage higher than the rated voltage at starting time, and setting a large number for the torque—number of rotations curb (T–N curb).

In contrast to this, the ultrasonic motor may not operate sometimes even when the rated voltage is applied. To prevent this and start reliably, a high voltage is applied at starting time. As shown in FIG. 5, the ultrasonic motor has hysteresis in its rotation characteristics. So the above-mentioned problems arise since if the frequency of an input voltage is not made considerably high, the motor will not shift to the section A to G and cannot start. In the invention, to counter this, a high voltage is applied, and the motor shifts immediately to the section A to G, thus obtaining a normal vibration state.

In the above paragraphs that describe the arrangement of the present invention, figures illustrating the embodiments are used to make the invention clear. However, this invention is not limited to the embodiments by this description.

DESCRIPTION OF THE PREFERRED EMBODIMENTS

One embodiment will now be described with reference to FIGS. 1 to 5. First, the phase difference between the input voltage of the ultrasonic motor MT and the monitor voltage $V_M$ obtained from the ultrasonic motor MT is detected. When this phase difference is out of a predetermined range, the motor is judged to be in the vibration diversion state. A critical voltage higher than the rated voltage at normal times is applied so that the motor is immediately restored to a normal vibration state. A voltage exceeding the critical voltage is likewise applied at starting time, improving the rise characteristics.

This critical voltage at starting time is set to the following value.

Figure 7:
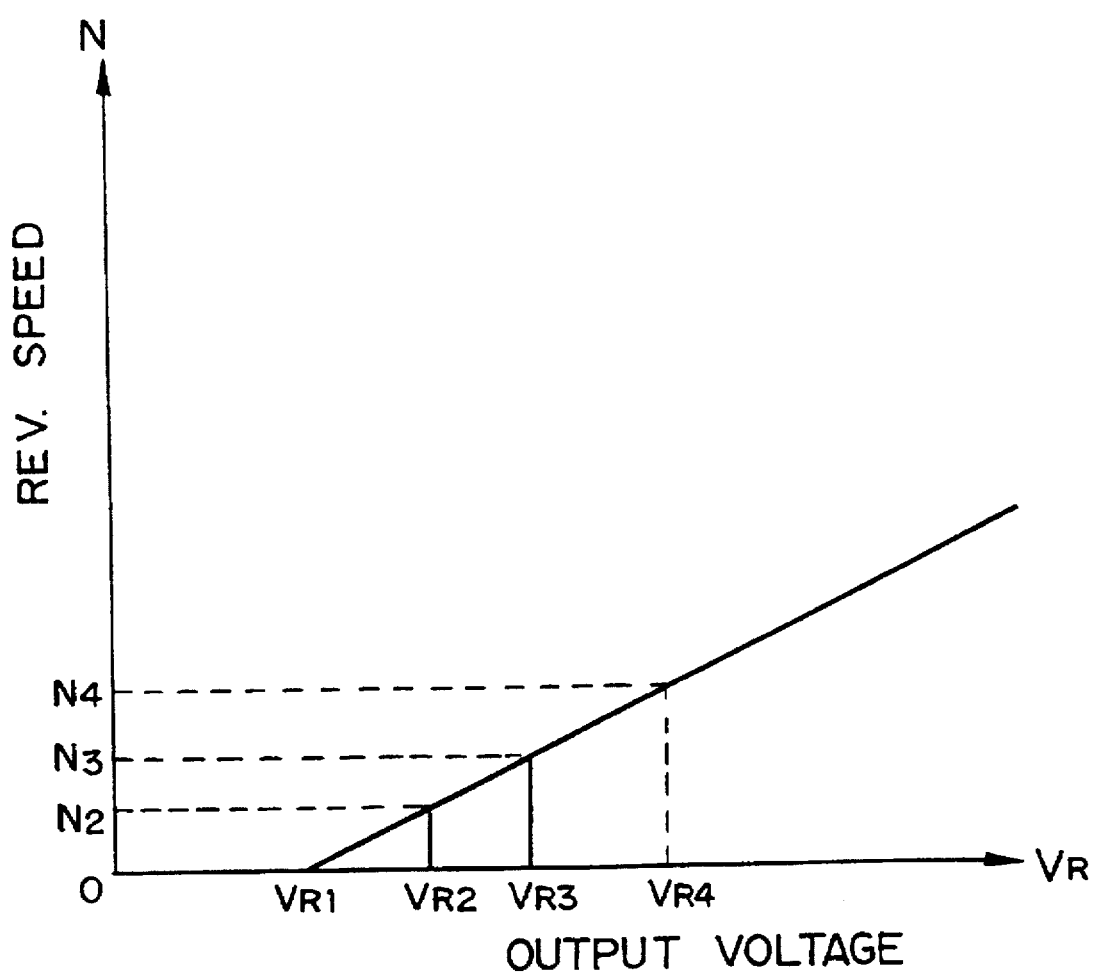
FIG. 7 is a drawing illustrating the starting characteristics.

In this kind of ultrasonic motor, there is a voltage at which the motor starts reliably within an allowable range of operating conditions, such as the environment in which the motor is used and the number of past uses. The lowest limit is called a critical voltage (e.g., denoted by $V_{R3}$ in FIG. 7). The voltages exceeding the critical voltage are denoted by $V_{R4}$ in FIG. 7, and the optimum value can be found by experiment.

Next, how to judge the vibration diversion state from the phase difference between the input voltage and the monitor voltage $V_M$ will be explained.

Figure 5:
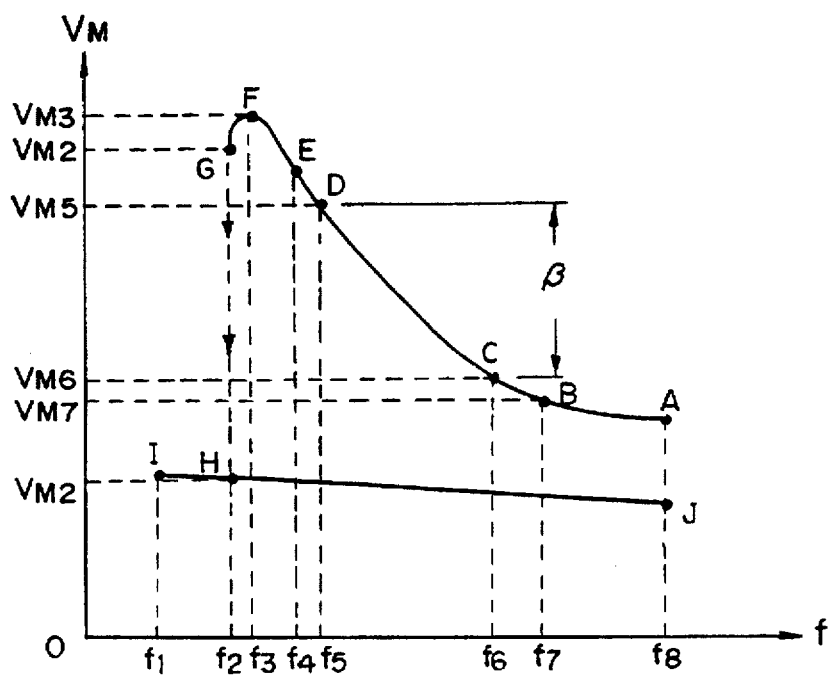
FIG. 5 is a drawing showing the relationships between the input frequency f and the monitor voltage $V_M$.

FIG. 5 is a drawing showing the relationships between the input frequency f and the monitor voltage $V_M$. The portion between A-B-C-D-E-F-G designates the characteristics at the time of normal vibration state, and shows resonance characteristics. The section C-D is a range within which the ultrasonic motor MT can be controlled easily, and is an ordinary use area. It can be used in the section A-B-C and in the section of frequencies higher than that in A. However, since a rotation speed becomes very slow, obtaining high rotation accuracy is difficult. It can also be used in the section D-E-F-G, but the operation is liable to be unstable because it is in the neighborhood of the resonance frequency $f_3$. Furthermore, the characteristics are very unstable at the frequency $f_2$ lower than the resonance frequency $f_3$ and the operation point is made to move only in the direction from G to H in the section G-H.

On the other hand, the section I-H-J designates the characteristics at the time of the vibration diversion state. When the operation point moves from G to H as described above, not only does the ultrasonic motor stop its rotation, but it also will no longer be restored to the normal vibration state of A to G by only increasing or lowering the frequency as in the section I-H-J.

It is known that this kind of ultrasonic motor MT has strong hysteresis characteristics.

Figure 6:
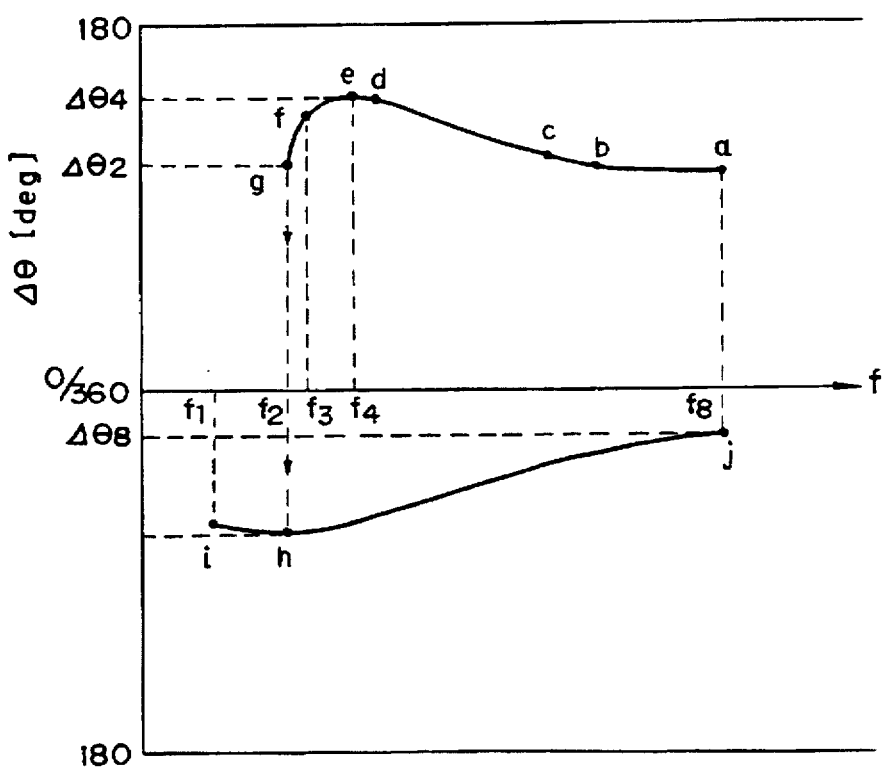
FIG. 6 is a drawing showing the relationships between the input frequency f and the phase difference $\Delta\theta$.

FIG. 6 is a drawing showing the relationships between the input frequency f and the phase difference $\Delta\theta$ between the input voltage of the ultrasonic motor MT and the monitor voltage $V_M$. Frequencies $f_1$ to $f_8$ correspond to FIG. 5, and the lower case, alphabetic letters a to j correspond to A to J of FIG. 5. As apparent from FIG. 6, the characteristics of the input frequency f and the phase difference $\Delta\theta$ are divided into the two modes of a-b-c-d-e-f-g and i-h-j in the same manner as in FIG. 5. The ultrasonic motor MT has such characteristics that the value of the phase difference does not change much in the section A-B-C-D-E-F-G even when the magnitude of an input voltage to it is changed. Hence, this phase difference $\Delta\theta$ is detected, and whether the motor is in a vibration diversion state or a normal vibration state can be judged on the basis of the value of the phase difference $\Delta\theta$.

Figure 1:
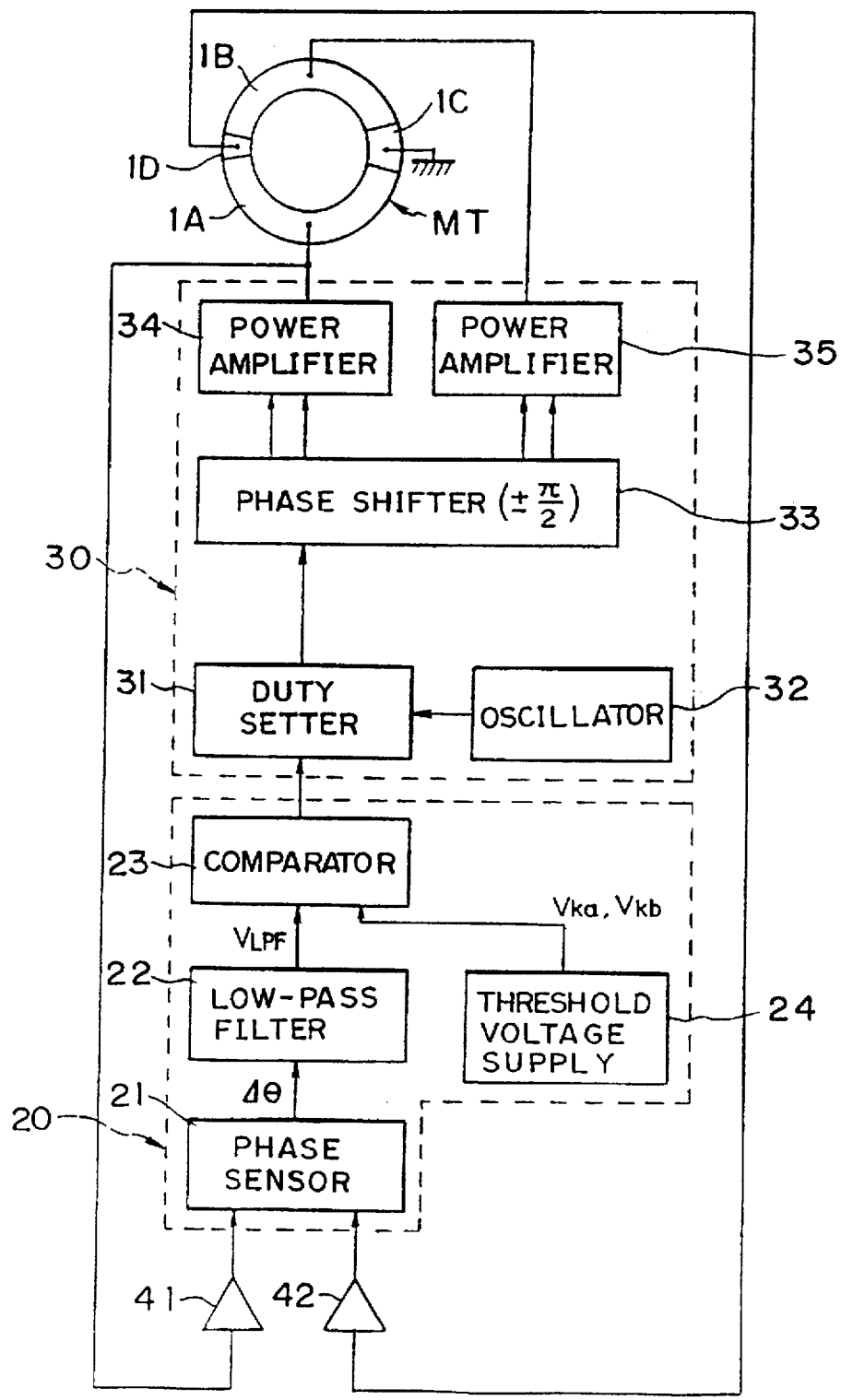
FIG. 1 is a block diagram of one embodiment of the device of the present invention.

FIG. 1 shows an overall arrangement of one embodiment.

Electrodes 1A, 1B for inputting a voltage, an electrode 1C for grounding, and an electrode 1D for detecting a monitor voltage are each formed in the ultrasonic motor MT. Each electrode, its functions and the relationships with the piezoelectric body are disclosed in U.S. Pat. No. 4,510,411, and thus an explanation about them is omitted.

The driving control circuit of such an ultrasonic motor MT consists of a vibration diversion state judgment circuit 20 and a power supply 30. The monitor voltage $V_M$ and one of the pair of input voltages are input to the vibration diversion state judgment circuit 20 via waveform shapers 41, 42. The vibration diversion state judgment circuit 20 has a phase detector 21, a low-pass filter 22, a comparator 23, and a threshold voltage source 24. The power supply circuit 30 has a duty setter 31, an oscillator 32, a phase shift circuit 33, and power amplifiers 34, 35.

Figure 2:
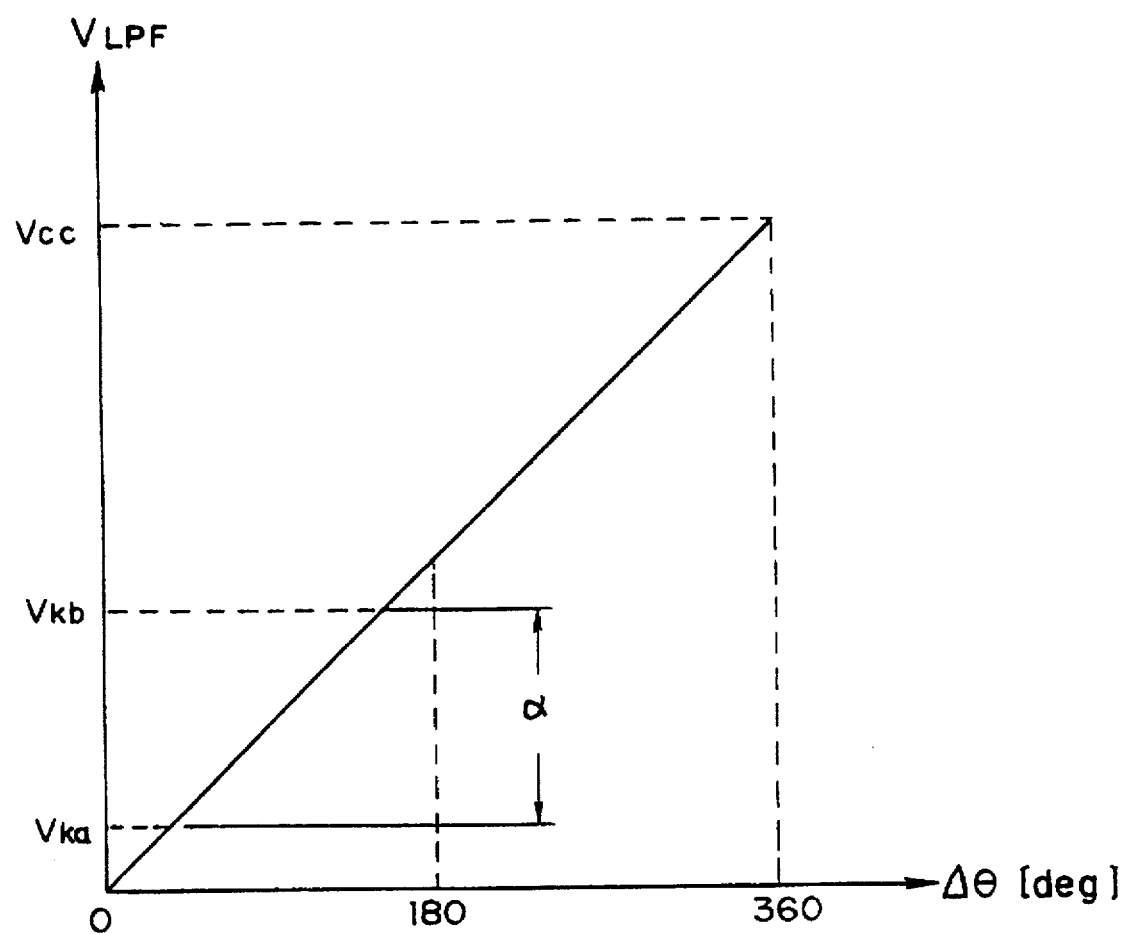
FIG. 2 is a drawing showing the relationships between the phase difference $\Delta\theta$ and the output of a low-pass filter $V_{LPF}$.

The input voltage to the electrode 1A and the monitor voltage $V_M$ from the electrode 1D are respectively input to the waveform shapers 41, 42, converted to logic signals and input to the phase detector 21. The phase detector 21 calculates the phase difference $\Delta\theta$ between the input voltage and the monitor voltage $V_M$, and inputs it to the low-pass filter 22. It is converted to the voltage $V_{LPF}$ dependent on the phase difference $\Delta\theta$ in the low-pass filter 22. The relationships between the phase difference $\Delta\theta$ and the voltage $V_{LPF}$ are as shown in FIG. 2. The section of voltages of $V_{ka}$ and $V_{kb}$ is the region α showing the normal vibration state. As there is no output from the phase detector 21 at the starting time, a signal showing phase difference 0 is input. The comparator 23 compares the input $V_{LPF}$ from the low-pass filter 22 and the outputs $V_{ka}$, $V_{kb}$ from the threshold voltage sources 24, and judges if the motor is in the vibration diversion state or normal vibration state.

The output of the comparator 23 is input to the duty setter 31. The pulse output of an oscillator 32 is processed to generate pulses having different duty ratio, and the input voltage is set. At this time, it is set so that the input voltage at the time of the vibration diversion state and at the starting time is made higher than the input voltage at the normal vibration state (rated voltage), that is, it exceeds the above-mentioned critical voltage. The output of the duty setter 31 is made two high-frequency signals π/2 out of phase via the phase shift circuit 33. Furthermore, it is amplified by the power amplifiers 34, 35, after which it is applied to the electrodes 1A, 1B of the piezoelectric member as the input voltage.

Next, the details of each block will be explained with reference to FIGS. 3 and 4(a)–4(m).

Figure 3:
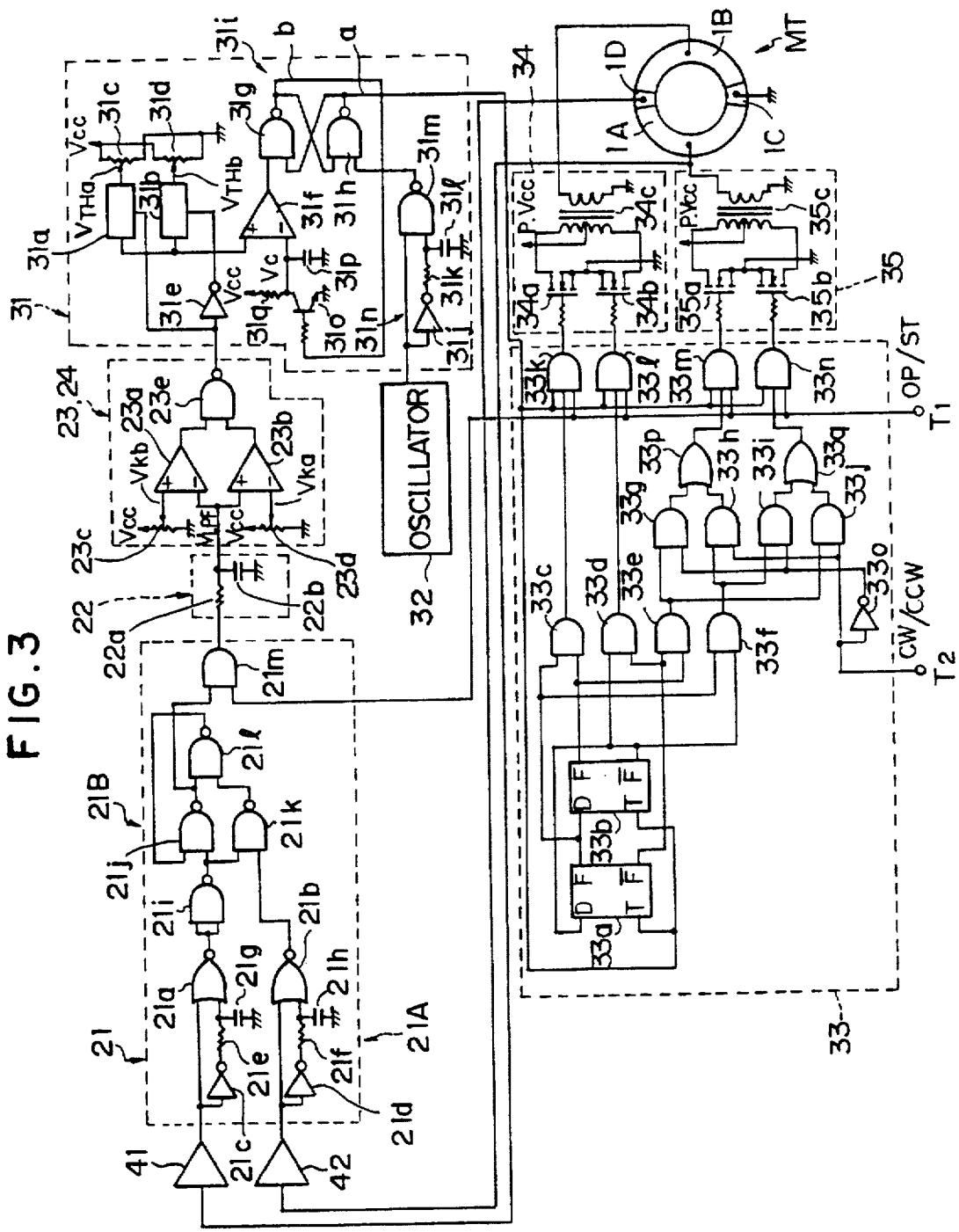
FIG. 3 is a drawing showing the details of FIG. 1.

Referring to FIG. 3, each circuit will be explained.

The phase detector 21 has a differentiating circuit 21A composed of NAND gates 21a, 21b, inverters 21c, 21d, resistors 21e, 21f, and capacitors 21g, 21h, a RS flip-flop 21B composed of the four NAND gates 21i to 21l, and an AND gate 21m. The terminal to which a operate/stop signal for the ultrasonic motor MT is input, is connected to one of the input terminals of the AND gate 21m. When a high-level operate signal is input to the terminal T1, the AND gate 21m is turned on, and when a low-level stop signal is input, it is turned off. The phase detector 21 arranged in this way detects the phase difference Δθ between the input voltage and the monitor voltage $V_M$, and outputs a pulse signal of the pulse width dependent on it.

The low-pass filter 22 consists of a resistor 22a and a capacitor 22b, and outputs a voltage proportional to the input pulse signal showing the above-described phase difference Δθ.

The comparator 23 and the threshold voltage source 24 have a pair of comparators 23a, 23b, a pair of variable resistors 23c, 23d, and a NAND gate 23e. By using the pair of variable resistors 23c, 23d, the upper and lower threshold values $V_{ka}$, $V_{kb}$ are set, and whether the $V_{LPF}$ is within the range is compared and detected by the comparators 23a, 23b.

The duty setter 31 comprises an RS flip-flop 31i composed of a pair of analog switches 31a, 31b, variable resistors 31c, 31d, an inverter 31e, a comparator 31f, and a pair of NAND gates 31g, 31h, a differentiating circuit 31n composed of an inverter 31j, a resistor 31k, a capacitor 31l, a NAND gate 31m, and a switching transistor 31o, a capacitor 31p, and a resistor 31q. This duty setter 31 outputs pulses of a small duty ratio as the output a of the RS flip-flop 31i when the phase difference Δθ is within a predetermined range. Conversely, it outputs pulses of a large duty ratio as the output a of the RS flip-flop when the phase difference Δθ is out of a predetermined range.

The phase shift circuit 33 comprises a pair of D flip-flops 33a, 33b, AND gates 33c to 33n, an inverter 33o, and OR gates 33p, 33q. This phase shift circuit 33 multiplies the output pulse of the duty ratio setter circuit 31 by ¼, and outputs a signal having a phase difference of +π/2 or −π/2 respectively to the power amplifiers 34, 35 according to the CW/CCW signal or the OP/ST signal that is input from the terminals T2, T1 respectively.

Power amplifiers 34, 35 comprising MOS transistors 34a, 34b, 35a, 35b, and transformers 34c, 35c respectively, amplify the signal from the phase shift circuit 33, and input the input voltage to the electrodes 1A, 1B of the piezoelectric member 1b.

The operation will be explained with reference to the waveform drawings of FIGS. 4(a)–4(m).

The waveforms on the left in FIGS. 4(a)–4(m) shows a normal rotation state in which the voltage $V_{LPF}$ is between the upper and the lower threshold values $V_{ka}$ and $V_{kb}$ respectively. The waveforms on the right show that the voltage $V_{LPF}$ is out of the range of the above threshold value and show the vibration diversion state.

Figure 4:
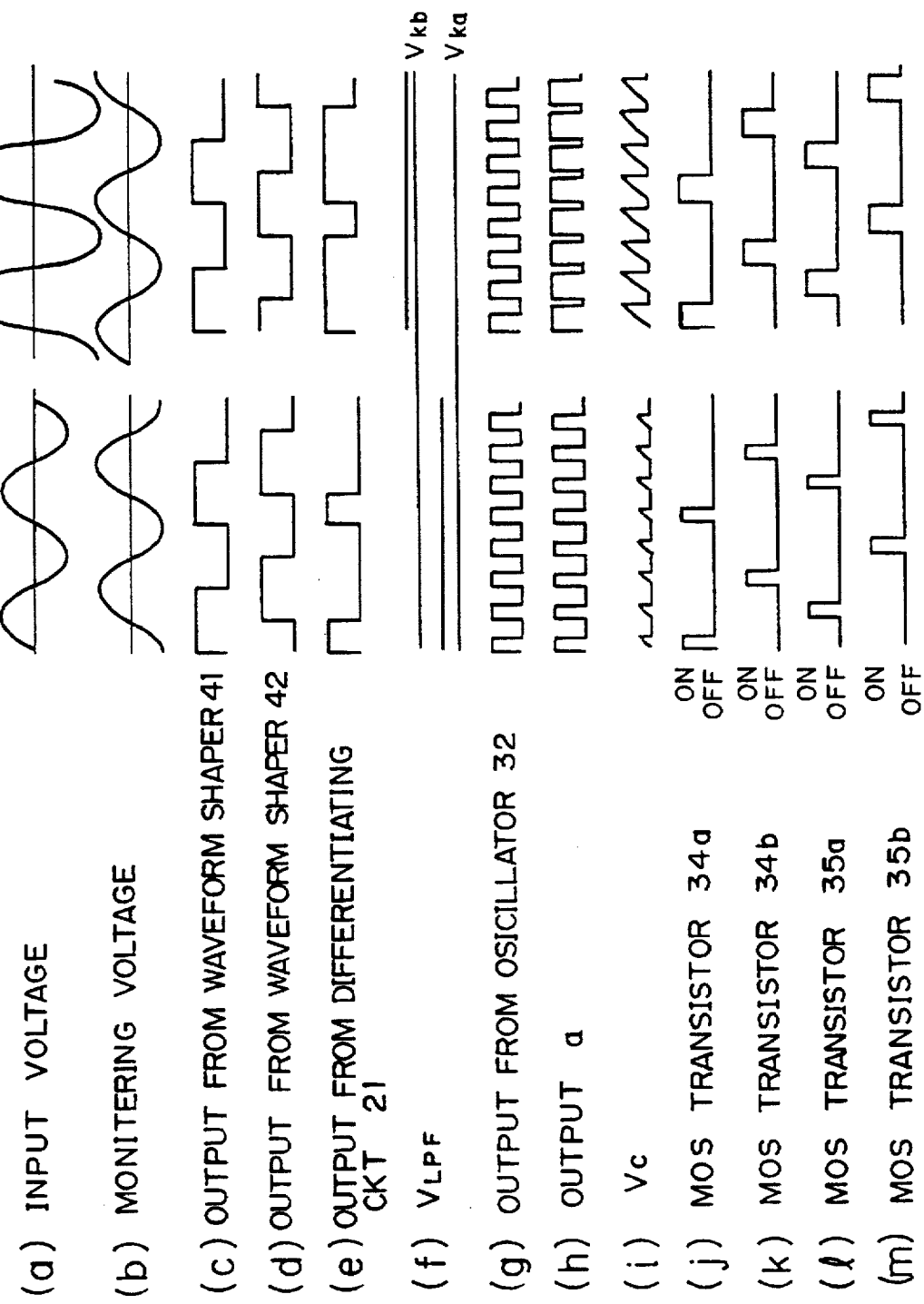
FIG. 4(a)–4(m) are time chart for the signals of each part of FIG. 3.

The waveform shapers 41, 42 convert the input voltage (FIG. 4 (a)) and the monitor voltage $V_M$ (FIG. 4 (b)) to logic signals (FIG. 4 (c), (d)). The outputs of the waveform shapers 41, 42 are made in accordance with a differentiating pulse in the differentiating circuit 21A, and are input to the RS flip-flop 21B. The output of this RS flip-flop 21B is the same as that in FIG. 4 (e), the pulse output of the pulse width corresponding to the phase difference Δθ between the input voltage and the monitor voltage $V_M$. When this pulse output is input to the low-pass filter 22, the output voltage $V_{LPF}$ becomes a voltage output proportional to the phase difference Δθ between the input voltage and the monitor voltage $V_M$, as shown in FIG. 4 (f). This voltage $V_{LPF}$ is input to the comparator 23. When the voltage $V_{LPF}$ is within the range of the threshold voltages $V_{ka}$ to $V_{kb}$, the outputs of the comparators 23a, 23b both become high, and the output of the NAND gate 23e becomes low. When the output voltage $V_{LPF}$ is not within the range of $V_{ka}$ to $V_{kb}$, the output of the NAND gate 23e becomes high since either one of the outputs of the comparators 23a, 23b becomes low.

The output of the NAND gate 23e is input to the duty setter 31 to control its analog switch 31a. And it controls the analog switch 31b by the signal inverted through the inverter 31e. These analog switches 31a, 31b are both switched on when the control input is low. $V_{THa}$ or $V_{THb}$ set in the variable resistors 31c, 31d are input to the analog switches 31a, 31b respectively. On the basis of the phase difference Δθ between the input voltage and the monitor voltage $V_M$, when the output voltage $V_{LPF}$ of the low-pass filter 22 is in the range of $V_{ka}$ to $V_{kb}$, the analog switch 31a is turned on to select $V_{THa}$. When it is not in that range, the analog switch 31b is turned on to select $V_{THb}$. A voltage from one of the analog switches is then input to the non-reverse input terminal of the comparator 31f.

The oscillator 32 oscillates at a frequency four times the driving frequency, and outputs the square wave shown in FIG. 4 (g). This output is converted to a negative pulse in the differentiating circuit 31n when it rises from a low level to a high level. The output a of the RS flip-flop 31i becomes high, and the other output b becomes low. At this time, the switching transistor 31o is turned off by the low-level signal of the output b. Then, the capacitor 31p is charged via the resistor 31q, and the terminal voltage $V_c$ of the capacitor 31p increases with time (FIG. 4 (i)). This terminal voltage $V_c$ is input to the reverse input terminal of the comparator 31f. When the capacitor 31p is charged and exceeds the reference voltage of the comparator 31f, the output of the comparator 31f is reversed, going from a high level to a low level. The output of this comparator 31f is input to the NAND gate 31g forming the RS flip-flop 31i, so the output b of the RS flip-flop 31i is reversed, becoming high. As a result of this, the switching transistor 31o is turned on, the capacitor 31p is discharged, and the output of the comparator 31f is reversed again, becoming high.

Next, when the output from the oscillator 32 rises again from low to high at the next cycle, the same operation is repeated again. Therefore, the time ratio of "H" and "L" in the output a of the RS flip-flop 31i, that is, the duty ratio, changes depending on the magnitude of the reference voltage of the non-reverse input terminal of the comparator 31f. In other words, if the reference voltage of the comparator 31f is high, the time of "H" becomes long. Conversely, if it is low, the time becomes short. Accordingly, if the voltages $V_{THa}$, $V_{THb}$ selected by the analog switches 31a, 31b are set to $V_{THa} < V_{THb}$, "H" in the output a of the RS flip-flop 31i become short, and "L" in the same output a becomes long due to the phase difference $\Delta\theta$ between the input voltage and the monitor voltage $V_M$, when the voltage $V_{LPF}$ is in the range of $V_{ka}$ and $V_{kb}$ (waveform on the left in FIG. 4). When the voltage $V_{LPF}$ is out of the range of $V_{ka}$ and $V_{kb}$, the "H" becomes longer than that in the former case (waveform on the right in FIG. 4). In other words, when the vibration diversion state is detected and the ultrasonic motor is started, a large duty ratio is set.

For the output a such that the duty ratio is set in this manner, its frequency is multiplied by ¼ by the phase shift circuit 33, and the output is converted to a signal for driving the power amplifiers 34, 35. The CW/CCW signal is a signal input for direction switching input, and the operate/stop signal is a signal input for operating and stopping. Both of them are logic inputs. The phase difference (+π/2 or −π/2) of the input voltage dependent on the rotation direction of the ultrasonic motor is formed by these inputs, and the stopping and driving of the ultrasonic motor is controlled.

The outputs of the AND gates 33k to 33n are connected to the gates of the MOS transistors 34a, 34b, 35a, and 35b respectively via resistors to drive the MOS transistors. These MOS transistors are connected to the primary side of the transformers 34c, 35c to drive these transformers 34c, 35c. At this point, when the ratio of the "H" time of the output a becomes long, that is, the duty ratio becomes large, the "ON" time of the MOS transistors becomes long, and the input voltage generated in the secondary side of the transformers 34c, 35c and input to the ultrasonic motor increases. Conversely, when the ratio of the above "H" time is small, that is, the duty ratio becomes small, the "H" time of the MOS transistors becomes short, and the input voltage becomes small.

The operation is as described above. By choosing the voltages of $V_{ka}$ and $V_{kb}$ properly, when the voltage $V_{LPF}$ deviates from the range determined by the $V_{ka}$ and $V_{kb}$, the vibration diversion state is detected, and the input voltage is set to a value exceeding the critical voltage which is higher than the rated voltage at the normal time, thus being restorable to the normal vibration state easily.

When the motor is changed from the stopped state to the operating state, the operate/stop signal is low in the stopped state, so the output from the AND gate 21m becomes "L". As the output voltage $V_{LPF}$ of the low-pass filter 22 is an output corresponding to the phase difference $\Delta\theta$, the output a of the duty setter 31 becomes a large duty signal, and the input voltage at the starting time becomes high. Since this voltage is set to a value exceeding the above-mentioned voltage, when a starting instruction signal rises, the ultrasonic motor starts rotating instantly in any environment, thereby making it possible to shorten the rise time of the input voltage.

In the above embodiment, the same voltage was applied in the starting time as at the time of the vibration diversion state, but a different value may be set for each of the times.

The vibration diversion state was judged from the phase difference between the input voltage and the monitor voltage in the above. However, it may be judged in the following manner. The following are provided: (1) applied voltage value detection means for detecting the voltage value of the frequency voltage applied to the piezoelectric member, (2) a number of rotation detection means for detecting the number of rotations of the ultrasonic motor, (3) monitor voltage value detection means for detecting the monitor voltage generated as the piezoelectric body changes its shape, and (4) phase difference detection means for detecting the phase difference between the frequency voltage applied to the piezoelectric member and the monitor voltage. It is judged that the vibration diversion state is in effect when the following conditions are detected by each of these detection means: the frequency voltage is higher than a predetermined value, the number of rotations is zero, the monitor voltage is lower than a predetermined value, and the phase difference is smaller than a predetermined value. It may also be judged by (1), (2) and (3), or (1), (2) and (4).

According to the present invention, when variations in load occur due to variations in temperature, humidity, pressure, viscosity of the lubricating oil, and the ultrasonic motor enters the vibration diversion state, the ultrasonic motor can be diverted immediately from the vibration diversion state to be restored to the normal vibration state by making the frequency voltage applied to the ultrasonic motor higher than at the normal state. Thus, a highly reliable ultrasonic motor can be provided.

Furthermore, according to the invention, in a friction contact type ultrasonic motor, the static friction of which changes due to variations in temperature, humidity, pressure, and viscosity of the lubricating oil, the ultrasonic motor can be made to rise quickly to a desired number of rotations by setting the frequency voltage applied at the time of starting a motor to a value exceeding the critical voltage which is higher than the rated voltage. A highly efficient operation is made possible by making the motor rotate at the rated voltage after that.

What is claimed is:

1. A control device for an ultrasonic vibration motor in which vibrations are generated on an elastic body by at least a pair of alternating voltages applied to an electromechanical transducer provided on the elastic body, said alternating voltages being out of phase to each other, comprising:

a power supply circuit electrically connected to said electromechanical transducer, which applies said at least a pair of alternating voltages to said electromechanical transducer; and a voltage control system including a state judgement circuit and a voltage control circuit;

wherein said state judgement circuit is electrically connected to said motor and is constructed to judge whether the motor is in an abnormal operating state in which said motor may stop operating, said motor being constructed so that it operates in a normal operating state corresponding to a first frequency characteristic curve and in the abnormal operating state corresponding to a second frequency characteristic curve having frequencies in common with said first frequency characteristic curve so that said motor can operate in either said normal operating state or said abnormal operating state at the same frequency, a predetermined portion of said first frequency characteristic curve defining a normal operating frequency range of said motor, wherein said voltage control circuit is electrically connected to said power supply circuit and increases the voltage magnitude of said at least a pair of alternating voltages when said state judgement circuit judges the abnormal operating state in order to place said motor in said normal operating state, wherein said state judgement circuit includes a detecting circuit which detects a monitor voltage generated in response to a deformation of said electromechanical transducer, and a comparing circuit which compares a phase difference between the monitor voltage and said at least a pair of alternating voltages with a reference value, and wherein said comparing circuit includes a circuit which generates an output voltage corresponding to the phase difference between the monitor voltage and said at least a pair of alternating voltages, and first and second comparators which respectively compare the output voltage with a first threshold voltage and a second threshold voltage.

2. A control device for an ultrasonic vibration motor in which vibrations are generated on an elastic body by at least a pair of alternating voltages applied to an electromechanical transducer provided on the elastic body, said alternating voltages being out of phase to each other, comprising:

a power supply circuit electrically connected to said electromechanical transducer, which applies said at least a pair of alternating voltages to said electromechanical transducer; and a voltage control system including a state judgement circuit and a voltage control circuit;

wherein said state judgement circuit is electrically connected to said motor and is constructed to judge whether the motor is in an abnormal operating state in which said motor may stop operating, said motor being constructed so that it operates in a normal operating state corresponding to a first frequency characteristic curve and in the abnormal operating state corresponding to a second frequency characteristic curve having frequencies in common with said first frequency characteristic curve so that said motor can operate in either said normal operating state or said abnormal operating state at the same frequency, a predetermined portion of said first frequency characteristic curve defining a normal operating frequency range of said motor, wherein said voltage control circuit is electrically connected to said power supply circuit and increases the voltage magnitude of said at least a pair of alternating voltages when said state judgement circuit judges the abnormal operating state in order to place said motor in said normal operating state, wherein said state judgement circuit includes a detecting circuit which detects a monitor voltage generated in response to a deformation of said electromechanical transducer, and a comparing circuit which compares a phase difference between the monitor voltage and said at least a pair of alternating voltages with a reference valve, and wherein said state judgement circuit includes a circuit which generates a pulse output with a duty ratio, which, when the phase difference is in a predetermined range, is different from a duty ratio when the phase difference is out of the predetermined range, and said voltage control circuit determines the voltage magnitude of said at least a pair of said alternating voltages based on the duty ratio of the pulse output.

3. A control device for an ultrasonic vibration motor in which vibrations are generated on an elastic body by at least a pair of alternating voltages applied to an electromechanical transducer provided on the elastic body, said alternating voltages being out of phase to each other, comprising:

a power supply circuit electrically connected to said electromechanical transducer, which applies said at least a pair of alternating voltages to said electromechanical transducer; and a voltage control system including state judgement means and voltage control means;

wherein said state judgement means judges whether the motor is in an abnormal operating state, said motor being constructed so that it operates in a normal operating state corresponding to a first frequency characteristic curve and in the abnormal operating state corresponding to a second frequency characteristic curve having frequencies in common with said first frequency characteristic curve so that said motor can operate in either said normal operating state or said abnormal operating state at the same frequency, a predetermined portion of said first frequency characteristic curve defining a normal operating frequency range of said motor, and wherein said voltage control means is electrically connected to said power supply circuit and increases the voltage magnitude of said at least a pair of alternating voltages when said state judgement means judges the abnormal operating state.

4. A control device according to claim 3, wherein said voltage control means lowers the voltage magnitude of said at least a pair of alternating voltages after the increase.

5. A control device according to claim 3, wherein said voltage control means increases the voltage magnitude of said at least a pair of alternating voltages to a value greater than a predetermined operating voltage of the motor.

6. A control device according to claim 5, wherein said voltage control means lowers the voltage magnitude of said at least a pair of alternating voltages to said predetermined operating voltage after the increase.

7. A control device according to claim 3, wherein said state judgement means includes a detecting circuit which detects a monitor voltage generated in response to a deformation of said electromechanical transducer, and a comparing circuit which compares a phase difference between the monitor voltage and said at least a pair of alternating voltages with a reference value.

8. A control device according to claim 7, wherein said comparing circuit includes a circuit which generates an output voltage corresponding to the phase difference between the monitor voltage and said at least a pair of alternating voltages, and first and second comparators which respectively compare the output voltage with a first threshold voltage and a second threshold voltage.

9. A control device according to claim 7, wherein said state judgement means includes a circuit which generates a pulse output with a duty ratio, which, when the phase difference is in a predetermined range, is different from a duty ratio when the phase difference is out of the predetermined range, and said voltage control means determines the voltage magnitude of said at least a pair of said alternating voltages based on the duty ratio of the pulse output.

10. A control device according to claim 3, wherein said state judgement means includes a detecting circuit which detects a monitor voltage generated in response to a deformation of said electromechanical transducer, and a comparing circuit which compares the monitor voltage with a reference value and generates an output indicating the abnormal operating state when the monitor voltage is out of a predetermined range.

11. A control device according to claim 3, wherein said state judgement means includes a detector which detects movement of a moving member.

12. A vibration motor in which vibrations are generated on an elastic body by an electromechanical transducer provided on the elastic body, comprising:

a power supply circuit electrically connected to said electromechanical transducer, which applies at least a pair of alternating voltages to said electromechanical transducer; and a voltage control system including a state judgement means and voltage control means;

wherein said state judgement means judges whether the motor is in an abnormal operating state, said motor being constructed so that it operates in a normal operating state corresponding to a first frequency characteristic curve and in the abnormal operating state corresponding to a second frequency characteristic curve having frequencies in common with said first frequency characteristic curve so that said motor can operate in either said normal operating state or said abnormal operating state at the same frequency, a predetermined portion of said first frequency characteristic curve defining a normal operating frequency range of said motor, and wherein said voltage control means is electrically connected to said power supply circuit and increases the voltage magnitude of said at least a pair of alternating voltages when said state judgement means judges the abnormal operating state.

13. An ultrasonic vibration motor having a stator and a moving member, in which vibrations are generated on an elastic body by at least a pair of alternating voltages applied to an electromechanical transducer provided on the elastic body, said alternating voltages being out of phase to each other, comprising:

a power supply circuit electrically connected to said electromechanical transducer, which applies said at least a pair of alternating voltages to said electromechanical transducer; and a voltage control system including state judgement means and voltage control means;

wherein said state judgement means judges whether the motor is in an abnormal operating state, said motor being constructed so that it operates in a normal operating state corresponding to a first frequency characteristic curve and in the abnormal operating state corresponding to a second frequency characteristic curve having frequencies in common with said first frequency characteristic curve so that said motor can operate in either said normal operating state or said abnormal operating state at the same frequency, a predetermined portion of said first frequency characteristic curve defining a normal operating frequency range of said motor, and wherein said voltage control means is electrically connected to said power supply circuit and increases the voltage magnitude of said at least a pair of alternating voltages when said state judgement means judges the abnormal operating state.

14. A control device according to claim 3, wherein said frequency characteristic curves relate the frequency of said alternating voltages to a voltage generated by the vibrations.

15. A control device according to claim 3, wherein said frequency characteristic curves are of the type shown in FIG. 5, in which $\beta$ designates the predetermined portion.

16. A vibration motor according to claim 12, wherein said frequency characteristic curves relate the frequency of said alternating voltages to a voltage generated by the vibrations.

17. A vibration motor according to claim 12, wherein said frequency characteristic curves are of the type shown in FIG. 5, in which $\beta$ designates the predetermined portion.

18. An ultrasonic vibration motor according to claim 13, wherein said frequency characteristic curves relate the frequency of said alternating voltages to a voltage generated by the vibrations.

19. An ultrasonic vibration motor according to claim 13, wherein said frequency characteristic curves are of the type shown in FIG. 5, in which $\beta$ designates the predetermined portion.

* * * * *